July 13, 1971  W. J. KUDLATY  3,592,766
SEPARABLE FILTER ELEMENT ASSEMBLY
Original Filed Feb. 12, 1968  2 Sheets-Sheet 1
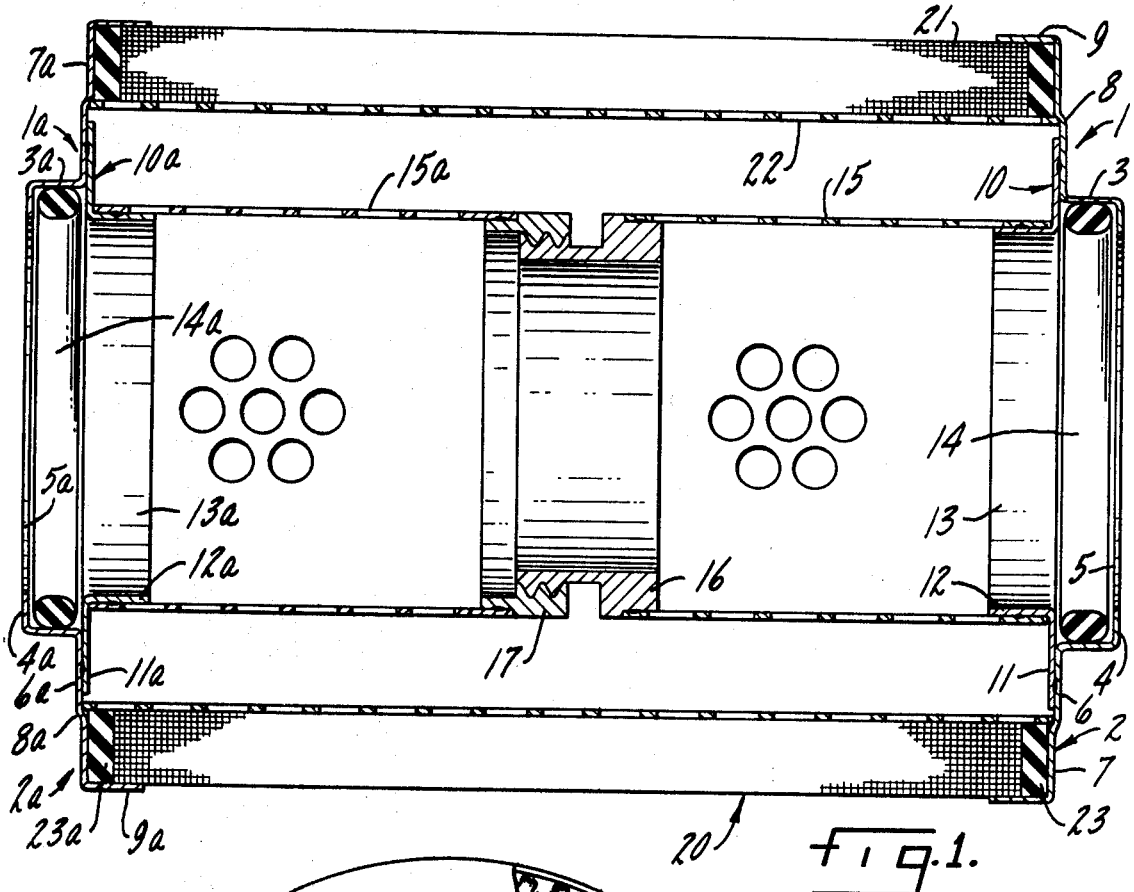
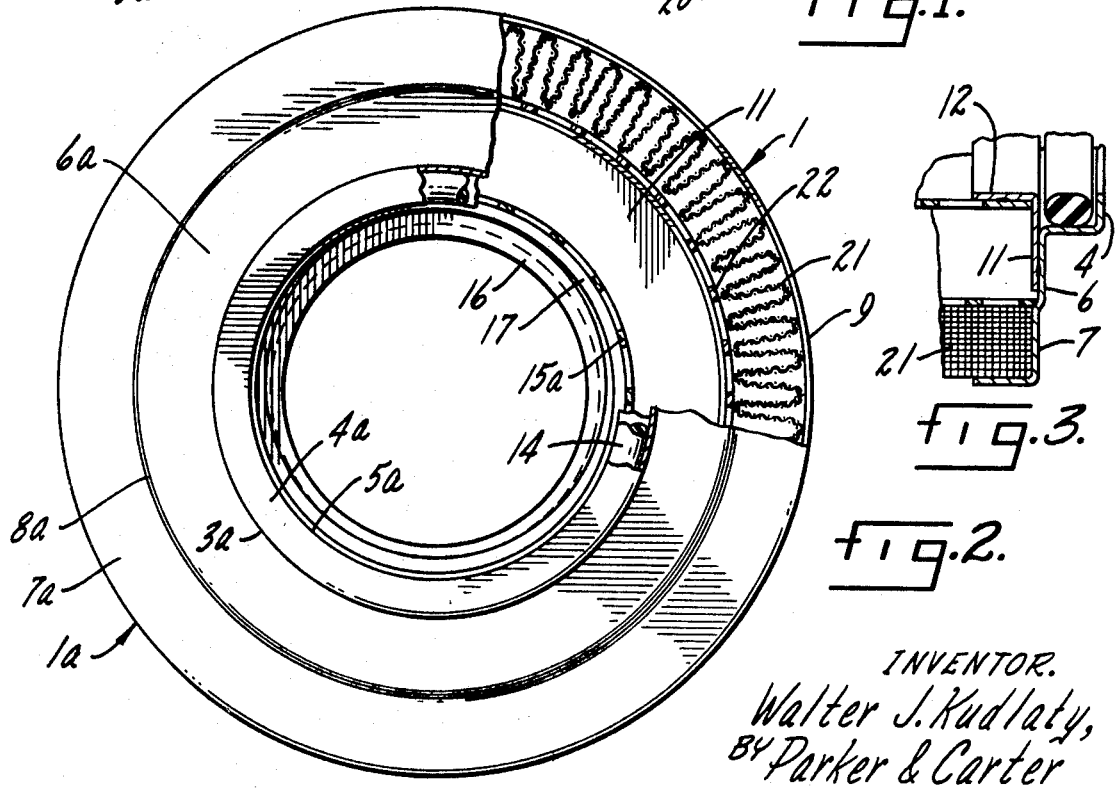
INVENTOR.
Walter J. Kudlaty,
By Parker & Carter
Attorneys.

July 13, 1971 W. J. KUDLATY 3,592,766
SEPARABLE FILTER ELEMENT ASSEMBLY
Original Filed Feb. 12, 1968 2 Sheets-Sheet 2
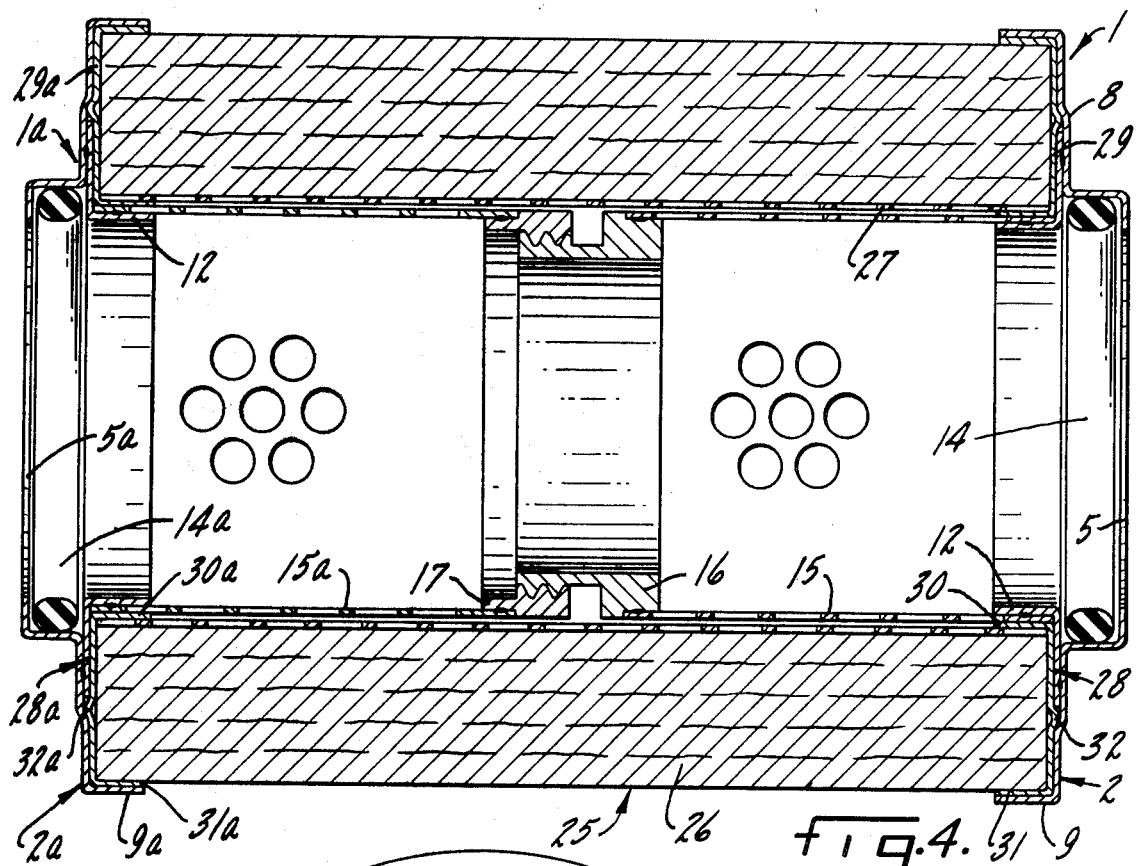
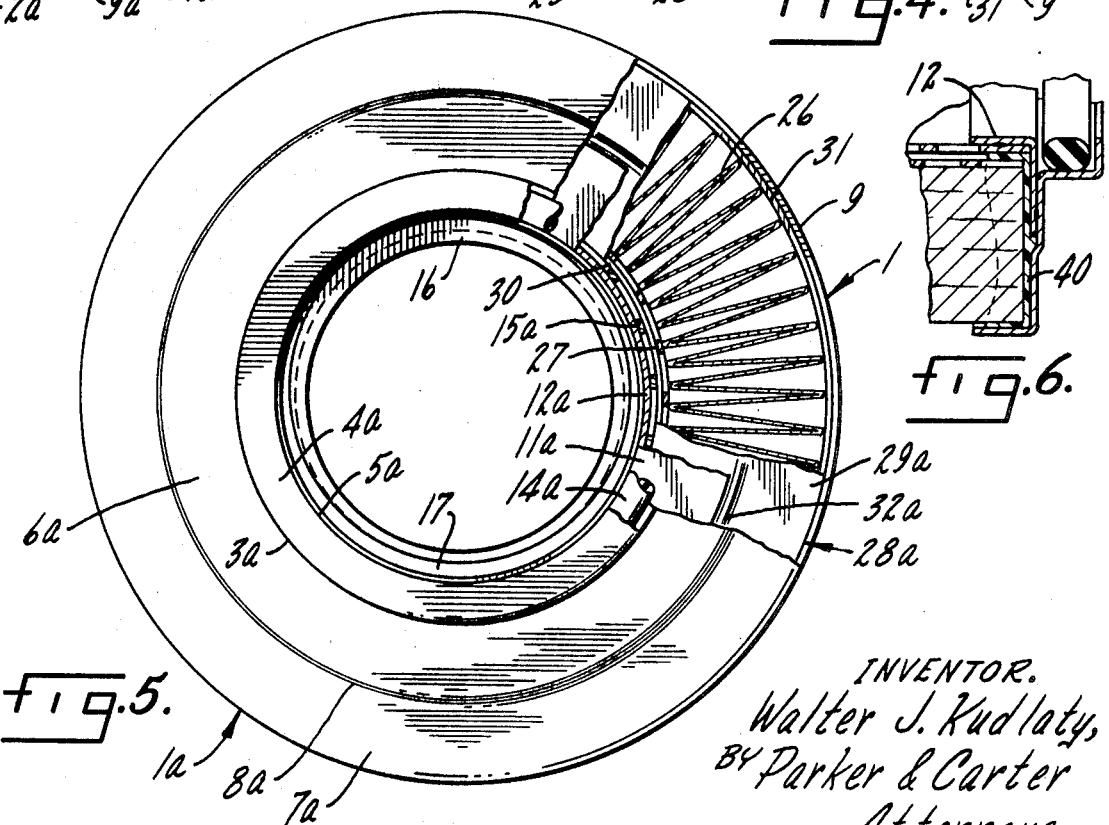
INVENTOR.
Walter J. Kudlaty,
BY Parker & Carter
Attorneys.

United States Patent Office 3,592,766
Patented July 13, 1971

3,592,766
SEPARABLE FILTER ELEMENT ASSEMBLY
Walter J. Kudlaty, Elmhurst, Ill., assignor to Marvel Engineering Company, Chicago, Ill.
Continuation of application Ser. No. 868,652, Oct. 22, 1969, which is a continuation of application Ser. No. 704,641, Feb. 12, 1968, both now abandoned. This application May 6, 1970, Ser. No. 35,298
Int. Cl. B01d 27/06
U.S. Cl. 210—232
6 Claims

ABSTRACT OF THE DISCLOSURE

A filter element assembly including a pleated filter media having an apertured tubular backing wall, a pair of end caps for the opposite ends of the filter media, each end cap carrying a tubular core portion of perforated metal and means for joining said core portions at their inner ends to secure said caps to each other. The joining means permit the length of the core to be varied to accommodate filter media of varying lengths.

---

This is a continuation of copending application Ser. No. 868,652, filed Oct. 22, 1969, which is a continuation of copending application Ser. No. 704,641, filed Feb. 12, 1968, and both now abandoned.

SUMMARY OF THE INVENTION

A filter element formed of a pair of end caps, each of the end caps carrying an inwardly directed core segment of perforated metal and means for manually joining the inner ends of said core segments to position a filter media between said end caps and externally of the core formed by said segments, said core being adjustable in length to accommodate filter media of varying lengths.

This invention relates to filter elements and has particular relation to a filter element readily adapted for cleaning or replacement of the filter media normally employed therewith.

One purpose of the invention is to provide a filter element having a central, perforated core which may be manually disassembled to permit removal and cleaning or replacement of a filter media.

Another purpose is to provide a filter assembly having a divided core which may be manually assembled to draw and uniformly compress a filter media between end caps carried by portions of said divided core.

Another purpose is a filter element in which the effective length of the core may be varied in response to rotation of the filter element end caps.

Another purpose is to provide a core and end-cap structure capable of manual assembly and disassembly without the employment of tools.

Another purpose is to provide a separable filter assembly having minimum restriction to the flow of fluid therethrough.

Another purpose is to provide a unitary, separable filter assembly having no loose connection parts.

Another purpose is to provide a filter assembly including end caps having media-positioning conformations thereon.

Another purpose is to provide a filter assembly having media-support and seal-positioning means.

Another purpose is to provide a filter element having a media-supporting core and an assembly-securing core.

Other purposes may appear from time to time during the course of the specification and claims.

The invention is illustrated more or less diagrammatically in the accompanying drawings wherein:

FIG. 1 is a cross-sectional side view of one form of filter assembly with the filter media and seals in a fully compressed condition;

FIG. 2 is an end view of FIG. 1, with parts broken away and in section;

FIG. 3 is a detail view of a variance of the structure of FIGS. 1 and 2;

FIG. 4 is a cross-sectional side view of the invention incorporating another filter media with the filter media in a fully compressed condition;

FIG. 5 is an end view of FIG. 3, with parts broken away and in section; and

FIG. 6 is a detail view of a variance of the structure of FIGS. 4 and 5.

Like parts are indicated by like numerals throughout the specification and drawings.

Referring now to the drawings, and particularly to FIG. 1, the numerals 1, 1a generally designate identical end caps. For convenience and clarity, therefore, end cap 1 may be described in detail, it being understood that end cap 1a corresponds thereto and corresponding elements of cap 1a are identified with the suffix a.

The cap 1 includes an annular flange or wall portion 2. Upstanding centrally of the wall 2 is a circumferential extension or boss 3. Inwardly extending from the outer end of boss 3 is an annular flange 4 defining an axial opening 5. The wall 2 includes an inner annular portion 6 adjacent the cylindrical wall of boss 3 and an outer annular portion 7. Between the wall portions 6 and 7, the wall 2 is offset, in a direction away from the direction of boss 3, to produce a type of annular ridge 8. A cylindrical wall portion 9 extends from the outer edge of wall portion 7 in a direction opposite to and paralleling that of boss 3.

Secured to the inner surface of wall portion 2, as by spot-welding for example, is a bracket 10. The bracket 10 includes annular wall portion 11 and circumferential portion 12 extending from the inner edge of wall portion 11 in a direction opposite that of boss 3 and paralleling wall 9. Wall portion 12 defines an opening 13 having a diameter substantially equal to that of opening 5. Positioned between an inner portion of wall 11 and the paralleling flange 4 is a seal 14 for sealing engagement with an appropriate outlet or mounting sleeve (not shown).

Secured to circumferential wall portion 12, as by spot-welding for example, is an inwardly directed core portion 15 formed of perforated metal and extending in coaxially parallel relationship with walls 9 and 12 in a direction opposite to that of boss 3.

The inner ends of core portions 15, 15a carry manually engageable male and female mating parts, which may be conveniently secured to said core portions by spot-welding, for example. As shown, the mating parts include an externally threaded sleeve or ring 16 carried by the inner end of core portion 15 and the internally threaded sleeve or ring 17 carried by the inner end of core portion 15a. The elements 16, 17 define an axial opening of maximum diameter, consistent with the accomplishment of increased support for the center of the core formed by portions 15, 15a, in order to provide for minimum restriction in the flow of fluid through the filter element assembly of the invention.

In FIG. 1 a filter media 20 is formed of a pleated layer of wire mesh or micron cloth 21, the inner curved portions of which are supported by and may be secured to a tubular backup or supporting circumferential wall 22 formed of perforated metal. The wall 22 is of sufficiently greater axial length than the media 21 to provide for engagement with the inner circumferential wall surface of end seal rings 23, 23a at its opposite ends.

Since the opposite end structure of the filter media members are identical, the same numerals are employed, with the suffix $a$ identifying those at one end.

It will be observed that the opposite edges of wall 22 engage the ridges 8, 8a of the end caps 1, 1a, respectively, and that the portions of wall 22 extending in opposite directions beyond the media 21 serve to position the seals 23, 23a, the walls 9, 9a engaging the external circumferential surfaces of seals 23, 23a and the adjacent end portions of media 21, the end cap wall portions 7, 7a seating the outer annular wall surfaces of rings 23, 23a.

It will be observed that the end caps 1, 1a and internal elements 15–17 may be employed with varying filter media members without change in elements 1–17.

Referring now to FIGS. 4 and 5, for example, it will be observed that the filter media 25 is formed of pleated filter paper 26. The inner curved surfaces of the pleated member 26 are supported by a tubular supporting wall or tube formed of perforated paper, said wall being indicated at 27.

End shells 28, 28a, formed of paper and generally U-shaped in cross-sectional configuration, engage the opposite ends of media 26 and wall 27, the shells including an annular wall portion 29 and inner and outer circumferential wall portions 30, 31. Wall portion 30 engages the inner end portion of wall 27 and is positioned between and in contact with the opposed external end portion surface of core 15. Wall portion 31 engages the outer end portion of media 26 and the inner surface of wall 9. A high compression ridge 32 is formed in the annular shell wall portion 29 and is positioned for seating against and engagement with the ridge 8. Since shells 28, 28a, and the filter element structural portions associated therewith are identical, it will be understood that the description of shell 28 corresponds to that of shell 28a. The shells 28, 28a are secured by an adhesive which may, for example, be an epoxy bond material.

In FIG. 3, seals 23, 23a have been removed, thus dispensing with extra parts, the metal mesh media 21 extending to and having a uniform, flat or square edge surface seating upon the inner surface of cap portion 7 to seal against leakage.

In FIG. 6, the end shells 28, 28a have been dispensed with a layer of epoxy, indicated by the numeral 40, has been substituted. It will be understood that the inner surfaces of end caps 1, 1a are supplied with a layer or film of grease or the like and a layer of epoxy is then applied, the end portions of paper media 26 entering the epoxy and being sealed against leakage when the epoxy dries and hardens. The prelubricating end caps 1, 1a insures their freedom to rotate for disassembly after hardening of the sealing epoxy layers.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention. For example, the enengageable-disengageable elements 16, 17 may take a variety of forms without departing from the nature and scope of the invention. The preferred form illustrated appears to provide the most uniform media compression between end caps 1, 1a and the maximum strengthening of the center of the core formed of portions 15, 15a and rings 16, 17, as well as a minimum restriction in the flow of fluid. Similarly, the preferred form shown provides for assembly and dissembly of the filter element structure by simple manual rotation, in relatively opposite directions, of end caps 1, 1a.

The use and operation of the invention are as follows:

The filter element of the invention may be employed with a variety of filter housings and with or without bypass valves or the like. Outlet sleeves may be inserted within one or both of the seals 14, 14a, a plug or closure being inserted within the opposite seal when an outlet sleeve is associated with only one of said seals. Similarly, a sleeve carrying a bypass valve assembly may be inserted within one of said seals and an outlet sleeve within the other of said seals or a closed end cap could be substituted for one of the caps 1, 1a.

It will be understood that fluid to be filtered enters from an area externally of the media 21 or 26 and is filtered during the course of its flow through said media. Thereafter the filtered fluid flows through perforated wall 22 or 27, respectively, and thence through the core formed of core portions 15, 15a for delivery through opening 5 or 5a to a place of use.

When the media 21 or 26 becomes contaminated to the point at which it requires cleaning or replacement, the operator, having removed the filter element of the invention from its housing, merely turns the caps 1, 1a in relatively opposite directions to disengage the threads of members 16, 17. As relative rotation occurs between said threads, the caps 1, 1a and core portions 15, 15a are moved in opposite directions away from each other.

When connecting elements 16, 17 are separated from each other, end caps 1, 1a and core portions 15, 15a are withdrawn from the filter media member 20 or 25.

Thereafter the media member 20 may be easily and simply cleaned and serviced for replacement and reuse if desired.

With the media 20 separated from the remainder of the filter element assembly of the invention, the media 21 may be more easily and rapidly cleaned, consisting as it does of only the mesh 21 and backup wall 22, both being exposed to cleaning fluids, brushes and the like. Seals 23, 23a are formed of resilient material capable of repeated reuse.

Media member 25, being formed entirely of paper, constitutes a minimum cost item which may be discarded and burned, the metallic structural portions of the filter element of the invention being continuously reusable with new filter media over an indefinite but extended and substantially unlimited life, the paper media member 25 being repeatedly replaceable without substantial expense. In filtering paint, for example, wherein the filter media becomes rapidly contaminated, the media member 25 may be economically replaced numerous times each day, whereas the replacement or cleaning of an entire, unitized filter element an equal number of times would prove economically unsatisfactory.

When the elements of the assembly shown in FIGS. 1 and 2 are to be reassembled after cleaning or replacement of media member 20 or 25, the core portions 15, 15a are inserted from opposite directions within wall 22 or 27. The operator, grasping caps 1, 1a, rotates the same in opposite relative directions to engage and interpenetrate the threads of members 16, 17. As this is accomplished the media member 20 and seals 23, 23a or media member 25 are subjected to uniform endwise compression throughout their annular areas.

No tools of any kind are required throughout the disassembly and reassembly of the filter element of the invention. No nuts, bolts or other connection parts are present or subject to loss.

The adjustable length of core formed by core portions 15, 15a permits a filter assembly to accommodate media members of varying lengths. This is particularly advantageous because it is economically unfeasible to manufacture the media members to close tolerances. The operator merely rotates the caps 1, 1a to rotate the core portions 15, 15a until a sufficient compression of the media member 20 and seals 23, 23a or media member 25 is obtained.

I claim:

1. A filter element including a pair of end caps,
   a core portion attached to each end cap with an externally threaded connection on one core portion and an internally threaded connection on the other core portion, and a circumferential media member positioned around said core portions and clamped between said end caps, the effective combined length of said core portions being varied in response to the relative rotation of said end caps to compress said media member between said end caps.

2. Claim 1 further characterized in that said core portions are formed of perforated tubular members and said threaded connections are hollow sleeves.

3. Claim 1 further characterized in that said circumferential media member includes a pleated wall of wire mesh material and an inner supporting circumferential wall formed of perforated metal.

4. Claim 3 further characterized in that seal rings of resilient material are positioned between said pleated wall of wire mesh material and said end caps.

5. Claim 1 further characterized in that said media member includes a pleated wall of filter paper, an inner supporting circumferential wall of perforated paper and end shells formed of paper and secured to the opposite ends of said pleated and supporting walls.

6. A filter element including a pair of metal end caps, a circumferential filter media member formed and adapted for clamping between said end caps, said media member being formed entirely of paper and including a circumferential pleated member and an annular shell member secured to each end of said pleated member, each of said annular shell members being generally U-shaped in cross-sectional configuration and having an external circumferential wall engaging an external end portion of said pleated member, and an internal circumferential wall engaging an internal end portion of said pleated member, said annular member having a base wall joining said inner and outer circumferential walls and engaging an end face of said pleated member, said pleated member end portion and shells being received within said end caps, said end caps having inner and outer circumferential walls formed and adapted for reception of the inner and outer circumferential walls of said shells, a perforated tubular member secured to one of said end caps and extending inwardly of said media member, a second perforated tubular member secured to the other of said end caps and extending inwardly of said media member, a first hollow sleeve carried by the inner end of said first tubular member, a second hollow sleeve carried by the inner end of said second tubular member, one of said sleeves being internally threaded, the other of said sleeves being externally threaded for engagement with said internally threaded sleeve in response to relative rotation of said end caps whereby the effective combined length of said first and second tubular members is varied in response to the relative rotation of said end caps and said media member is compressed between said end caps.

References Cited
UNITED STATES PATENTS 3,367,508   2/1968   Buckman et al. _____ 210—457

JAMES L. DeCESARE, Primary Examiner

U.S. Cl. X.R.

210—350, 457, 493